United States Patent
Ramer

(10) Patent No.: US 7,126,105 B2
(45) Date of Patent: Oct. 24, 2006

(54) TECHNIQUE FOR LENSLESS OPTICAL POSITIONING WITH A PLURALITY OF LIGHT COLLECTORS

(75) Inventor: David P. Ramer, 1516 Deer Point Way, Reston, VA (US) 20194

(73) Assignee: David P. Ramer, Reston, VA (US)

( * ) Notice: Subject to any disclaimer, the term of this patent is extended or adjusted under 35 U.S.C. 154(b) by 171 days.

(21) Appl. No.: 10/938,617

(22) Filed: Sep. 13, 2004

(65) Prior Publication Data

US 2006/0054792 A1    Mar. 16, 2006

(51) Int. Cl.
*H01J 40/14* (2006.01)

(52) U.S. Cl. .................................. 250/221; 250/206.1

(58) Field of Classification Search ................ 250/221, 250/206.1, 216
See application file for complete search history.

(56) References Cited

U.S. PATENT DOCUMENTS 4,212,516 A * 7/1980 Sawamura .................. 385/115

* cited by examiner

*Primary Examiner*—Que T. Le
(74) *Attorney, Agent, or Firm*—Antonelli, Terry, Stout & Kraus, LLP

(57) ABSTRACT

Systems and methods for determining a position of an object are provided by the present invention. Light is captured by at least one collector. Each collector has a first opening through which light enters that is larger than a second opening through which light exits. The exiting light is used by at least one light detector to generate signals. The position of the object is determined based upon the generated signals.

21 Claims, 10 Drawing Sheets

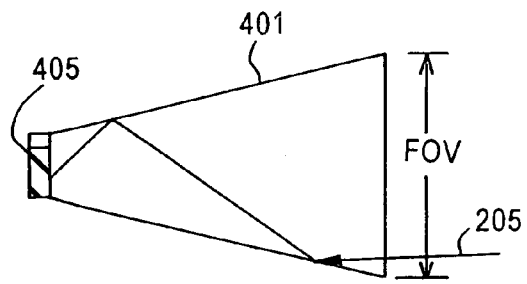
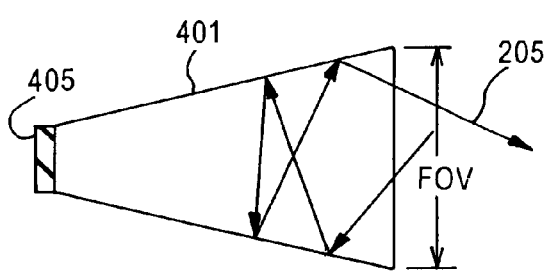
Figure 4A
Figure 4B
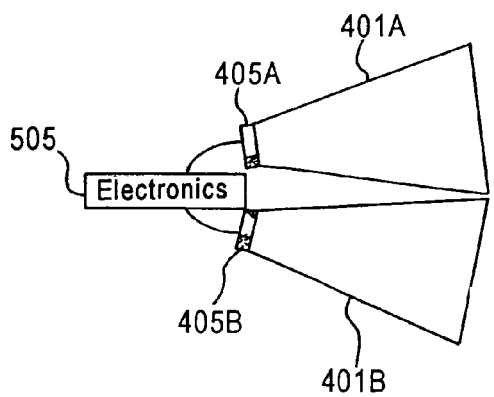
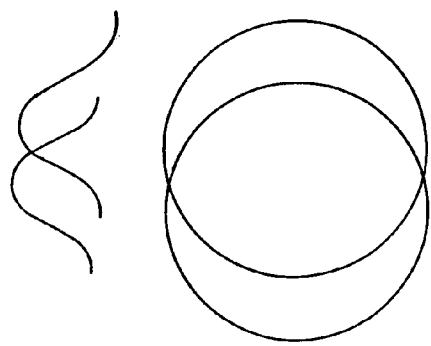
Figure 5A
Figure 5B

TECHNIQUE FOR LENSLESS OPTICAL POSITIONING WITH A PLURALITY OF LIGHT COLLECTORS

FIELD OF THE INVENTION

The present invention is related to optical positioning devices, and more particularly to a lensless optical positioning device.

BACKGROUND OF THE INVENTION

Optical position devices are well known. They are utilized in a variety of applications, including common automatic toilet flushers, video games, and sophisticated laser guided munitions. FIG. 1 is a simplified depiction of a laser guided munitions application. As shown, a laser beam 110 is aimed at a building 115 from an airplane 105. A missile 100 includes a seeker 120 that senses laser light 125 reflected from the building 115. The seeker 120 tracks the reflected laser light 125, guiding the missile to the building 115.

There are two primary methods of optical position detection. One utilizes a Position Sensitive Detector (PSD), and the other utilizes a Quad Detector. Both a PSD and a Quad Detector include a lens to focus light onto a detector surface.

FIG. 2A is a first depiction of a PSD showing a lens 201 focusing light 205 onto a detector surface 210. Processing electronics 215 convert angular displacement into linear displacement. A PSD gives lateral position of a focused image of a light source by generating a differential current. As shown in FIG. 2B, one cathode (C) and at least two anodes (A) are in contact with a detector surface 210. Current through an anode is proportional to the position of the light imaged onto the detector surface 210 due to resistance of the detector surface 210. In the example of FIG. 2B, focused light 205 strikes the detector surface 210 two-thirds of the width of the detector surface 210 away from anode $A_2$, and one-third the width of the detector surface 210 away from anode $A_1$. As a result of the resistance, one-third of the produced current flows through anode $A_2$, and two-thirds of the produced current flows through anode $A_1$. The current from the two anodes is then processed by the processing electronics 215 to determine where on the detector surface 210 the focused light 205 is imaged to determine an angular position of the light source.

The advantage of utilizing a PSD is that continuous angular position can be determined throughout the PSD's angular field of view. However, disadvantages associated with PSD's include a slow response time, typically in the range of milliseconds, which is too slow for many applications, and a high noise floor, resulting in low sensitivity. Thus, PSD's cannot be used in certain applications, such as laser guided munitions. PSD's are typically relegated to more common applications, such as automatic toilet flushers and automatic sinks.

FIG. 2C is a simplified depiction of a Quad Detector. A Quad Detector includes four detector surfaces 220A–D constructed on a single piece of silicon. Similar to a PSD, a lens 201 focuses light 205. The light 205 is focused on the junction where the four detectors 220A–D converge, and, when properly aligned, falls equally on all four detectors 220A–D. If the junction is not properly aligned, the light 205 will fall disproportionally onto the four detectors 220A–D, causing unequal signal strength from the four detectors 220A–D. The lens 201 must be mechanically realigned to properly position the light 205 on the junction of the four detectors 220A–D. This mechanical realignment is achieved utilizing a gimbal (not shown in the Figures). Detected light 205 is then sent to processing electronics 215 to determine the angular position of the light source. An advantage of utilizing a Quad Detector is that Quad Detectors have a fast response time. Thus, they are utilized in sophisticated applications, such as laser guided munitions. A disadvantage is that an expensive gimbal must be utilized for continuous angular position tracking within the Quad Detector's field of view.

Accordingly, a need exists for an optical position device that has a fast response time and does not require the use of a gimbal.

Both PSD's and Quad Detectors also suffer from a waste of detector sensitivity. While a good lens may have a F# of F2, and an excellent lens may have a F# of F1, most of the sensitivity provided by lenses in optical position devices is wasted. FIG. 3 is a simplified depiction the wasted sensitivity. The angular sensitivity subtended by a typical optical detector such as a PSD or Quad Detector is pi. However, a lens uses only a small fraction of this subtended sensitivity. For example, an excellent F1 lens only subtends 0.58 pi. This excellent F1 lens wastes greater than 70% of the available pi sensitivity of the detector.

Accordingly, a need exits for an optical position device which does not utilize a lens.

OBJECTS OF THE INVENTION

It is an object of the present invention to provide an optical position device which has a fast response time.

It is also an object of the present invention to provide an optical position device that does not require a gimbal.

It is yet another object of the present invention to provide an optical position device with increased sensitivity.

Still another object of the present invention is to provide an optical position device that does not require a lens.

The above-stated objects, as well as other objects, features, and advantages, of the present invention will become readily apparent from the following detailed description which is to be read in conjunction with the appended drawings.

SUMMARY OF THE INVENTION

In accordance with the present invention, optical position devices and methods for determining the position of an object are provided. The position of the object is determined based on light, which is a form of electromagnetic radiation. The light could be visible light, infrared light, laser light, or any other form of light.

In one embodiment of the present invention, an optical position device is provided that includes a plurality of collectors each configured to capture light, a plurality of light detectors, and processing electronics. Each of the plurality of collectors has a first opening through which light enters, and a second opening through which light exists. The first opening is larger than the second opening. Also, each of the plurality of collectors could be aligned in parallel, or could be in any other alignment desired. Each of the plurality of light detectors is associated with a respective one of the plurality of collectors. Each light detector detects light that exits a second opening of a respective collector and generates a signal in response to the exiting light. That is, the signal, which is preferably an electrical signal, though it could be an optical or any other type signal, is generated based upon the exiting light. The processing electronics then determines a position of the object based upon the signals from each of the plurality of light detectors.

According to one aspect of this embodiment, the plurality of collectors is two collectors, and the plurality of light detectors is two light detectors. Based upon the signals from the two light detectors, the determined position of the object is a position that is defined in a single axis. In a further aspect, this determined single axis position is an azimuth position, which is a horizontal angular distance from a reference point.

In another aspect of this embodiment, the plurality of collectors is three collectors, and the plurality of light detectors is three light detectors. Based upon the signals from the three light detectors, the determined position of the object is a position that is defined in two axes. In a further aspect, this determined two axis position is an azimuth position and an elevation position.

According to still another aspect of this embodiment, at least one of the plurality of collectors has a shape different than the remainder of the plurality of collectors. That is, a length might be different, a width might be different, a first opening size might be different, a second opening size might be different, or any other factor influencing shape might be different.

In an especially beneficial aspect of this embodiment, each of the plurality of collectors are positioned so that the center axis of each collector are divergent. That is, the center axes of the collectors are not parallel. Each collector has a field of view, and because of the positioning of the collectors, these fields of view overlap.

In another beneficial aspect of this embodiment, the processing electronics is further configured to determine a distance of the object from the optical position device. That is, the processing electronics processes the signals from the plurality of light detectors to determine the distance from the optical position device to the object.

According to yet another aspect of this embodiment, the object whose position is determined is a target and the optical position device is associated with a weapon. The determined position is utilized to guide the weapon to the target. This guidance could be human guidance, or some form of automatic guidance. In a still further aspect, the processing electronics is further configured to generate electrical signals based upon the determined position. These generated electrical signals guide the weapon to the target. Thus, in this further aspect, the guidance is automatic. A human does not have to guide the weapon to the target. Rather, the processing electronics performs the guidance.

In yet another aspect of this embodiment, the optical position device lacks a lens. In other words, light is not focused upon a light detector by a lens. Rather, the optical position device functions without lenses.

In still another aspect of this embodiment, each of the plurality of collectors has a reflective inner surface. That is, any collected light contacting the inner surface is reflected. Preferably, reflected light is directed toward the second opening, though it could be, as desired, reflected in another direction.

In another embodiment of the present invention, an optical position device is provided that includes a collector, a plurality of light detectors, and processing electronics. The collector is, as described above, configured to capture light and has a first opening through which light enters and a second opening through which light exits. The first opening is larger than the second opening. The plurality of light detectors are each associated with the collector and are each configured to detect the exiting light and generate a signal based upon the exiting light. As in the first embodiment, the processing electronics are configured to determine a position of the object based upon the generated signals. Different from the first embodiment, in this embodiment a plurality of light detectors are associated with a single collector. That is, light captured by the single collector is detected by multiple light detectors. The signals produced by each of these multiple light detectors associated with the single collector are utilized by the processing electronics to determine the position of the object.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIGS. 4A and 4B depict light detected by a conical optical position device in accordance with certain aspects of the present invention.

FIG. 5A depicts a two-coned embodiment of the present invention.

FIG. 5B depicts the field of view of the two-coned embodiment of FIG. 5A.

DETAILED DESCRIPTION OF PREFERRED EMBODIMENT(S)

As shown in FIGS. 4A and 4B, optical position devices in accord with the present invention utilize non-imaging reflective optics. In a preferred embodiment of such a device, a cone 401 funnels light 205 to a detector 405. The cone 401 has a reflective inner surface that collects light from different directions to take advantage of the full sensitivity of detector 405. The cone may be, as desired, constructed of Mylar, plastic, glass, metal, or any substantially reflecting surface. For the best gain, substantially specular surfaces are preferred. However, quasi-specular surfaces may be used to smooth sensitivity irregularities. Even substantially diffuse surfaces could be used where high gain is not required. The cone may also be, as desired, constructed of a transparent solid with either Total Internal Reflection (TIR) or a reflector surface. A detector 405 is preferably a silicon and diode detector, though it could be any type detector capable of detecting light, such as, but not limited to, a photoresistor or a photomultiplier.

Light inside of a cone's field of view (FOV), as shown in FIG. 4A, is funneled to the detector 405, while light outside of a cone's FOV, as shown in FIG. 4B, is reflected back outside of the cone 405 such that it does not reach the detector 405. The FOV of a cone is defined by the angle subtended by that cone. The gain of the cone is related to its FOV. A 30 degree cone has a gain of at least 14, and a 20 degree cone has a gain of at least 33. Thus, a narrower cone provides more sensitivity. The sensitivity of the present invention is greater than that of either a PSD or a Quad Detector. For example, a 30 degree cone in accordance with the present invention has a gain of at least four times that of either a PSD or Quad Detector outfitted with F1 lenses providing a 30 degree FOV. The increased sensitivity afforded by the present invention may be utilized to reduce cost and/or improve performance in application compared to the use of PSD's or Quad Detectors.

Figure 1:
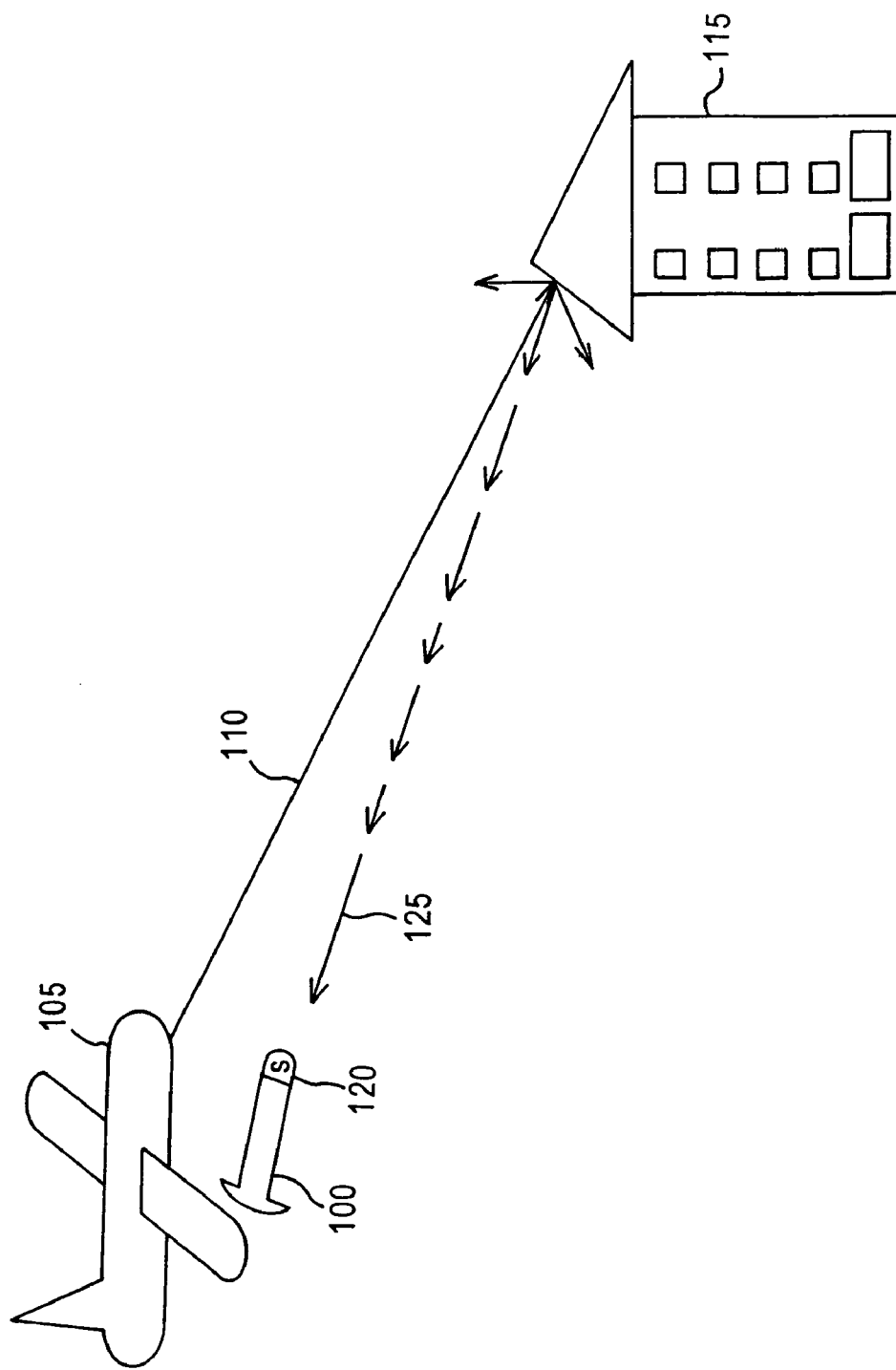
FIG. 1 is a simplified depiction of a prior art laser guided missile system.
Figure 2A:
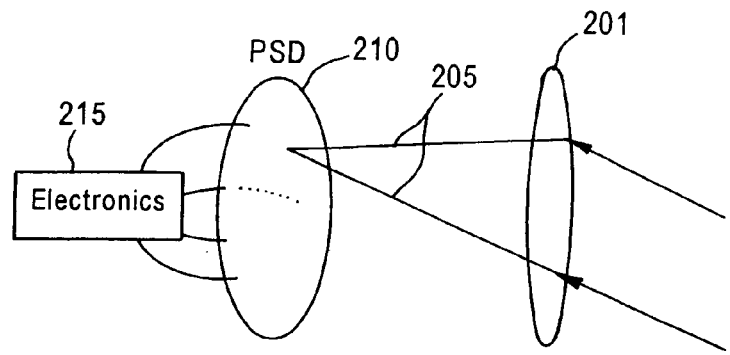
FIG. 2A depicts a prior art Position Sensitive Detector (PSD).
Figure 2C:
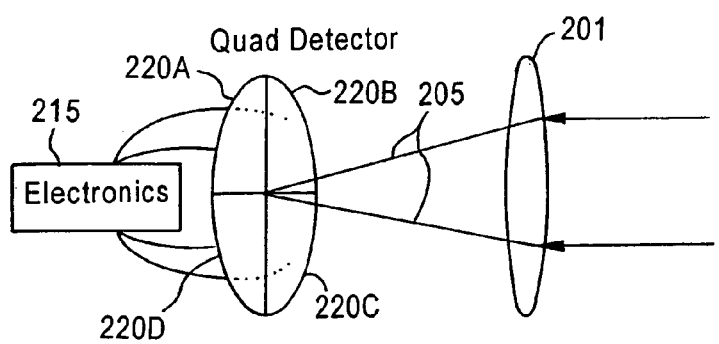
FIG. 2C depicts a prior art Quad Detector.
Figure 3:
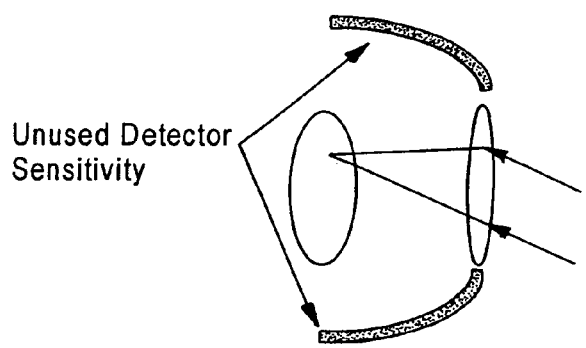
FIG. 3 is a simplified depiction of unused detector sensitivity of prior art PSD's and Quad Detectors.
Figure 2B:
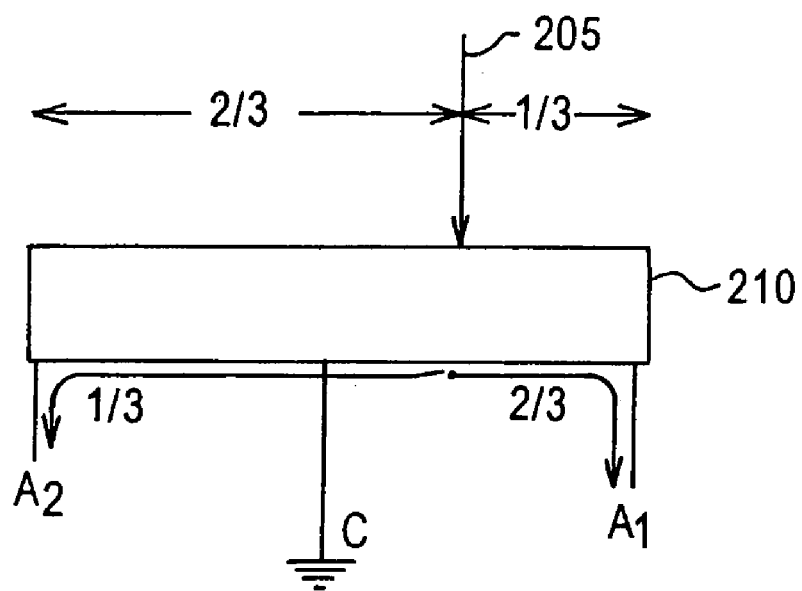
FIG. 2B depicts current flow in a detector surface of the prior art PSD of FIG. 2A.
Figure 4C:
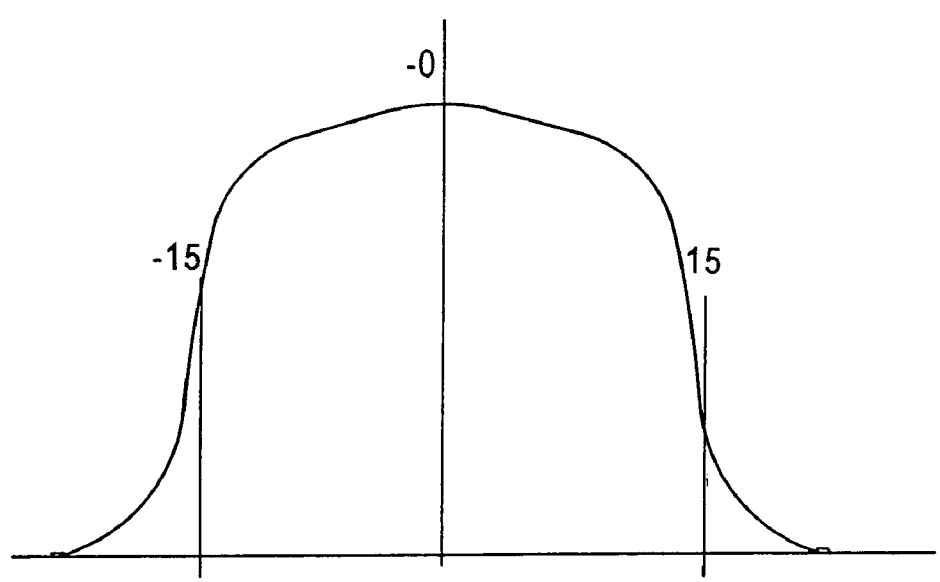
FIG. 4C depicts angular sensitivity of a conical optical position device in accordance with certain aspects of the present invention.

As will be discussed further below, the use of multiple cones provides an increased FOV while maintaining the high sensitivity, i.e., higher gain, of a narrower cone. The detector 405 turns detected light 205 into an electrical signal that is sent to processing electronics to determine angular position of a light source. The processing electronics, not shown in FIGS. 4A and 4B, will be further discussed below. The resulting sensitivity of the cone-detector combination peaks in the center of the FOV and then falls off toward the edge of the FOV, and then falls off rapidly outside of the FOV. FIG. 4C is a simplified depiction of the angular sensitivity of a cone-detector combination.

FIG. 5A depicts two cones 401A and 401B utilized together in an optical position device to determine the angular position of a light source in one dimension, i.e., a single axis position (an azimuth). Such a two cone device is especially useful in range-finding applications. Cones 401A and 401B are positioned such that their respective fields of view slightly overlap. To achieve the overlap, cones 401A and 401B point generally in the same direction, but slightly out from one another. In other words, the center axes of cones 401A and 401B slightly diverge, with the center axes closer near the base (detector end) of each of cones 401A and 401B. As a light source moves, light collected by one cone decreases, while light collected by the other cone increases. The lengths of cones 401A and 401B are chosen to achieve an optimum overlap. FIG. 5B depicts the overlapping fields of view of cones 401A and 401B. Signals output by detectors 405A and 405B are sent to processing electronics 505. Processing electronics 505 could be, as desired, analog or digital electronics.

Though not shown in the Figures, as desired, a single cone which funnels light onto two detectors could be utilized. Such an embodiment would reduce manufacturing costs, but would have less than optimal performance when compared to a two-cone embodiment. Also not shown in the Figures, the cones of multiple-cone embodiments could be, as desired, positioned such that at least two respective center axes are parallel.

Figure 5C:
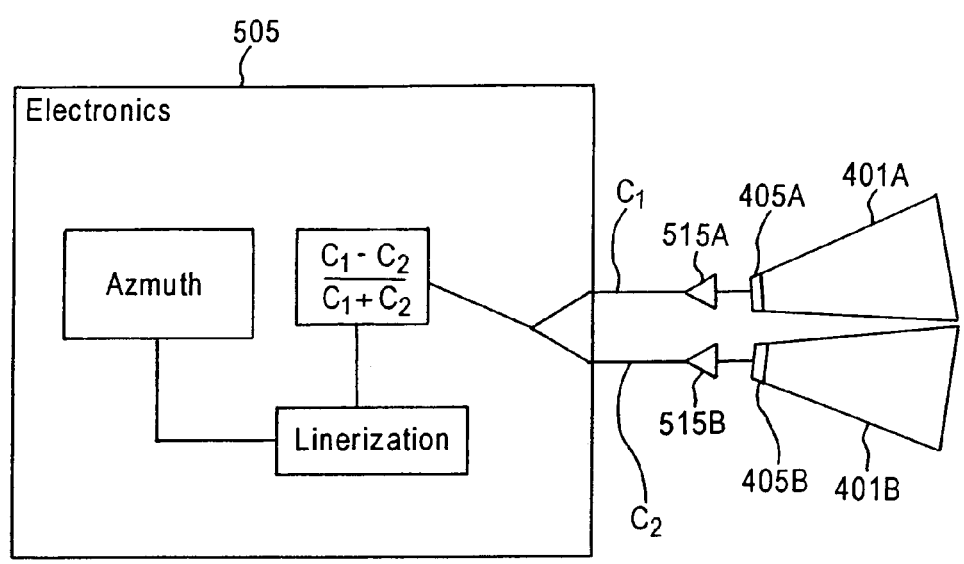
FIG. 5C is a further depiction of the two-coned embodiment of FIG. 5A.

FIG. 5C is a further depiction of a two-cone optical position device. A signal output by detector 405A is sent to an amplifier 515A. The amplified signal, shown as $C_1$, is then sent to processing electronics 505. Likewise, a signal output by detector 405B is sent to an amplifier 515B, and the amplified signal, shown as $C_2$, is then sent on to processing electronics 505. The processing electronics 505 then process the amplified signals according to equation (1) to determine an approximate single axis position, i.e., azimuth (Pa), of the source of the light 205.

$$Pa \approx (C_1 - C_2)/(C_1 + C_2) \qquad (1)$$

Equation (1) is independent of the intensity of the detected light 205. The computed Pa is then linearized through the use of a look-up table or functional, i.e., numerical, algorithm, as is known in the art, to find the exact azimuth of the light source in relation to the cones 401A and 401B.

Figure 9:
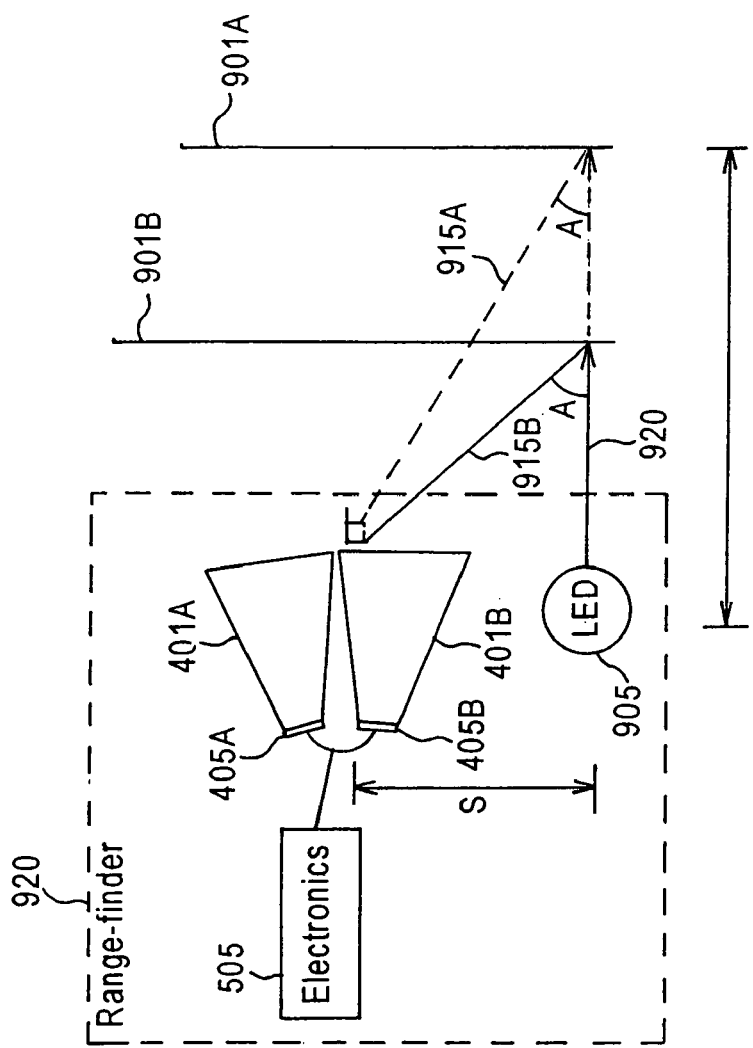
FIG. 9 depicts a range-finder in accordance with certain aspects of the present invention.

Introduced above, a two-cone device is especially useful in range-finder applications, such as automatic toilet flushers and automatic sinks. FIG. 9 depicts a range-finder 920. Shown are cones 401A and 401B, detectors 405A and 405B, processing electronics 505, and LED 905. S is the distance between the LED 905 and the cones 401A and 401B. Distance S is stored in the processing electronics 505. Line 901A represents an object at a first distance from the range-finder 920, and line 901B represents the object at a second, closer, distance from the range-finder 920. LED 905 emits a light 920 that is reflected off the object 901 and sensed by detectors 405A and 405B. Electronics 505 calculates an angle (A) based upon the sensed position of the object 901 in relation to the range-finder 920. Then, processing electronics 505 calculates distance D from the range-finder 920 to the object 901 utilizing equation (3).

$$D = S/Tan(A) \qquad (2)$$

Figure 6A:
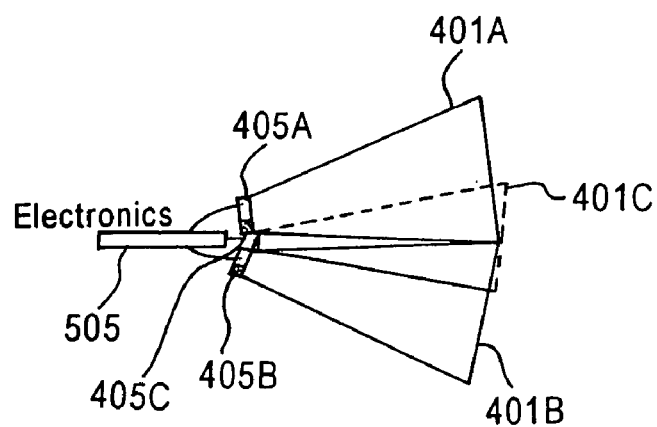
FIG. 6A depicts a three-coned embodiment of the present invention.
Figure 6B:
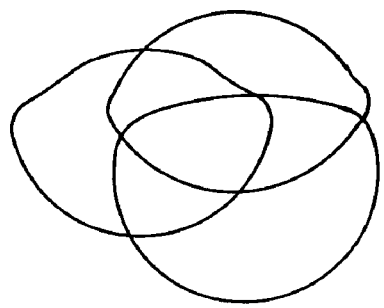
FIG. 6B depicts the field of view of the three-coned embodiment of FIG. 6A.

FIG. 6A depicts three cones 401C, 405D and 401E utilized together in an optical position device to determine the angular position of a light source in two dimensions, i.e., a dual axis position. A third cone 401C is added to the two-cone device discussed above. Each of cones 401A, 401B, and 401C are positioned such that their respective fields of view slightly overlap, as shown in FIG. 6B. Similar to the two-cone device, the overlap is achieved by cones 401A, 401B, and 401C pointing in generally the same direction, but with the respective center axes slightly diverging, with the three center axes closer near the base (detector end) of each cones 401A, 401B, and 401C.

Figure 6C:
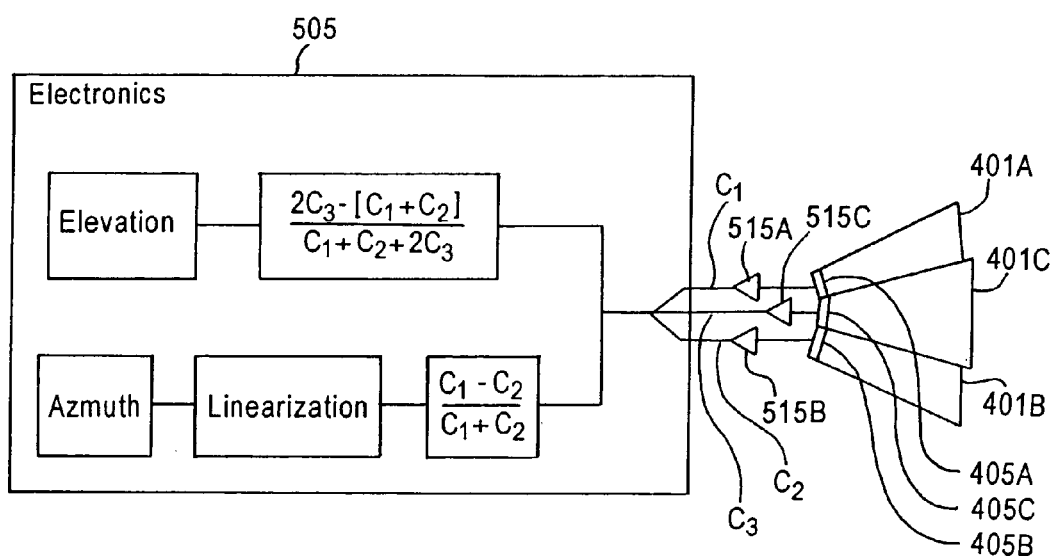
FIG. 6C is a further depiction of the three-coned embodiment of FIG. 6A.

FIG. 6C is a further depiction of a three-cone optical position device. A signal output by detector 405A is sent to an amplifier 515A. The amplified signal, shown as $C_1$, is then sent on to processing electronics 505. A signal output by detector 405C is sent to an amplifier 515C. This amplified signal, shown as $C_3$, is then sent on to processing electronics 505. Likewise, a signal output by detector 405B is sent to an amplifier 515B, and the amplified signal, shown as $C_2$, is then sent on to processing electronics 505. The processing electronics 505 then process amplified signals $C_1$ and $C_2$ according to equation (1) to determine an approximate azimuth (Pa) of the light source, and processes all three amplified signals according to equation (2) to determine the elevation (Pe) of the light source. As in the two-cone device, the exact Pa is determined by linearization of the computed approximate Pa from equation 1.

$$Pe \approx [2C_3 - (C_1 + C_2)]/(C_1 + C_2 + 2C_3) \qquad (3)$$

The determined Pa and Pe may be utilized to track a light source's position. A real-time Pa coupled to an X input of an oscilloscope, with the corresponding real-time Pe coupled to the Y input, produces an xy conversion of a light source's position, which is shown on the oscilloscope's display as a track.

Such an xy conversion can easily be utilized with laser guided munitions to provide an inexpensive and reliable guidance system. The xy conversion is displayed on a monitor having cross-hairs displayed thereon. A laser guided missile is then manually controlled by steering the missile such that the displayed track is brought into the cross-hairs. That is, steering flaps on the missile move, in response to a remote operator's commands, to position the missile in the cross-hairs. Still further, a missile's guidance system can also be programmed to automatically adjust the missile's direction (by flap adjustment) based upon Pa and Pe without operator input.

Introduced above, the present invention provides a cost savings over the use of PSD's or Quad Detectors. For example, the cost of materials for the three-cone device described above is approximately $30, while the cost of a Quad Detector is approximately $90. Additionally, the rise time ($T_r$) of the present invention is greater than that afforded by either a PSD or a Quad Detector. Rise time is the time taken for the output to rise from 10% to 90% of its peak value in response to an input step waveform. The rise time of the present invention is $3.0 \times 10^{-9}$, while the rise time of a Quad Detector is $3.0 \times 10^{-8}$ and the rise time of a PSD is $1.5 \times 10^{-6}$. Thus, the present invention has a rise time that is ten times faster than a Quad Detector, and five hundred times faster than a PSD.

Figure 8:
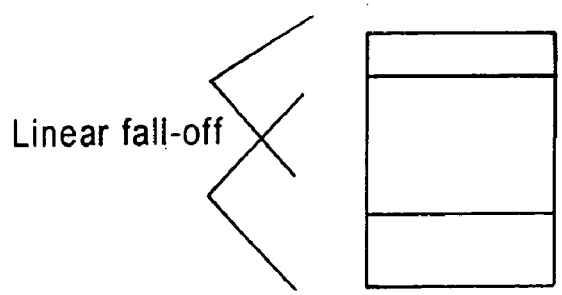
FIG. 8 depicts a linearized field of view in accordance with certain aspects of the present invention.
Figure 7A:
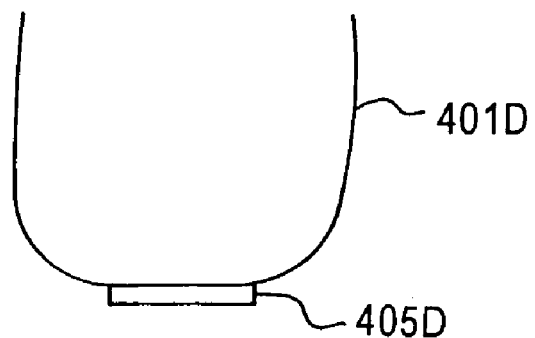
FIG. 7A depicts a first alternate cone shape in accordance with certain aspects of the present invention.
Figure 7B:
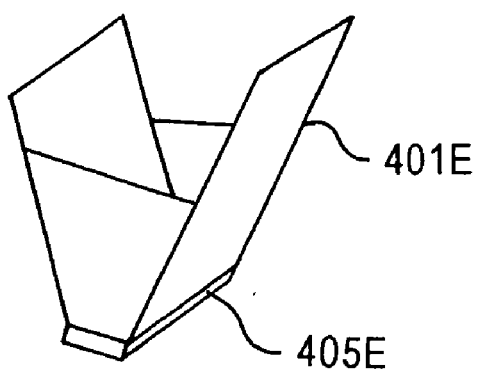
FIG. 7B depicts a second alternate cone shape in accordance with certain aspects of the present invention

Advantageously, different shape cones may be utilized in different applications to tailor the field of view. As shown in FIG. 7A, the cone, as desired, could be in the shape of a compound parabolic concentrator 401D, which is placed on detector 405D. Another shape, shown in FIG. 7B is a four-sided pyramid 401E, also placed on a detector 405E. With the pyramid 401E, two facing sides are longer than the two other facing sides. The pyramid 401E gives a narrower field of view in one direction and is especially useful in obtaining a very linear distribution across a field of view in a single axis, as shown in FIG. 8. Obtaining a linear distribution reduces the linearization processing discussed above in relation to equation (1). Another shape, shown in FIG. 7C is that of a curved cone 401F placed upon a detector 405F.

Additionally, it may be desirable, in certain applications, to utilize cones of two or more different shapes and/or sizes. For example, for applications requiring high accuracy in a narrow field of view in one axis, and a wide field of view in another axis, two cones having a narrow degree field of view would be utilized for the narrow axis, and a single cone having a larger degree field of view would be utilized for the wide axis. Furthermore, as desired, more than three cones could be utilized together in certain applications.

The present invention is not to be limited in scope by the specific embodiments described herein. Indeed, various modifications of the present invention in addition to those described herein will be apparent to those of skill in the art from the foregoing description and accompanying drawings. Thus, such modifications are intended to fall within the scope of the appended claims.

What is claimed is:

1. An optical position device for determining a position of an object, comprising:
   a plurality of collectors configured to each capture light, each of the plurality of collectors having a first opening through which light enters and a second opening, having a size smaller than a size of the first opening, through which light exits;
   a plurality of light detectors, each associated with a respective one of the plurality of collectors and configured to detect the exiting light and generate a signal responsive to the exiting light; and
   processing electronics configured to determine a position of the object based upon the generated signals.

2. The device of claim 1, wherein:
   the plurality of collectors is two collectors;
   the plurality of light detectors is two light detectors; and
   the determined position is a position defined in a single axis.

3. The device of claim 2, wherein the determined position is an azimuth position.

4. The device of claim 1, wherein:
   the plurality of collectors is three collectors;
   the plurality of light detectors is three light detectors; and
   the determined position is a position defined in two axes.

5. The device of claim 4, wherein the determined position includes an azimuth position and an elevation position.

6. The device of claim 1, wherein one or more of the plurality of collectors has a shape different than the remainder of the plurality of collectors.

7. The device of claim 1, wherein:
   each of the plurality of collectors are aligned such that a center axis of each of the plurality of collectors are divergent; and
   fields of view of each of the plurality of collectors overlap.

8. The device of claim 1, wherein the processing electronics is further configured to determine a distance of the object from the optical position device.

9. The device of claim 1, wherein:
   the object is a target;
   the optical position device is associated with a weapon; and
   the determined position is used to guide the weapon to the target.

10. The device of claim 9, wherein the processing electronics is further configured to generate electrical signals based upon the determined position to guide the weapon to the target.

11. The device of claim 1, wherein the optical position device excludes a lens.

12. The device of claim 1, wherein each of the plurality of collectors has a reflective inner surface.

13. A method for determining a position of an object, comprising:
   capturing light in each of a plurality of collectors;
   detecting the captured light;
   generating a plurality of signals, each of the plurality of signals based upon the detected light captured by a respective one of the plurality of collectors; and
   determining a position of the object based upon the plurality of generated signals.

14. The method of claim 13, wherein:
   the plurality of collectors is two collectors; and
   the determined position is a position defined in a single axis.

15. The method of claim 14, wherein the determined position is an azimuth position.

16. The method of claim 13, wherein:
   the plurality of collectors is three collectors; and
   the determined position is a position defined in two axes.

17. The method of claim 16, wherein the determined position includes an azimuth position and an elevation position.

18. The method of claim 13, wherein:
each of the plurality of collectors are aligned such that a center axis of each of the plurality of collectors are divergent; and
fields of view of each of the plurality of collectors overlap.

19. The method of claim 13, further comprising:
determining a distance of the object from the optical position device.

20. The method of claim 13, wherein the object is a target and the optical position device is associated with a weapon, and further comprising:
generating electrical signals based upon the determined position; and
guiding the weapon to the target based upon the generated electrical signals.

21. An optical position device for determining a position of an object, comprising:
a collector configured to capture light and having a first opening through which light enters and a second opening, having a size smaller than a size of the first opening, through which light exits;
a plurality of light detectors, each associated with the collector and configured to detect the exiting light and generate a signal responsive to the exiting light; and
processing electronics configured to determine a position of the object based upon the generated signals.

* * * * *